United States Patent
Ziegler et al.

(10) Patent No.: US 6,874,138 B1
(45) Date of Patent: Mar. 29, 2005

(54) METHOD AND APPARATUS FOR RESUMING EXECUTION OF A FAILED COMPUTER PROGRAM

(75) Inventors: Michael L. Ziegler, Campbell, CA (US); Carol L. Thompson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 525 days.

(21) Appl. No.: 09/724,616

(22) Filed: Nov. 28, 2000

(51) Int. Cl.[7] .............................. G06F 9/44; G06F 11/00
(52) U.S. Cl. ...................... 717/127; 717/124; 717/126; 717/129; 717/131; 714/38
(58) Field of Search .................. 717/124, 126, 717/127, 129, 131; 714/38

(56) References Cited

U.S. PATENT DOCUMENTS

| | | | |
|---|---|---|---|
| 5,590,277 A | * 12/1996 | Fuchs et al. ................... | 714/38 |
| 5,621,885 A | * 4/1997 | Del Vigna, Jr. ............... | 714/13 |
| 5,630,047 A | * 5/1997 | Wang .......................... | 714/15 |
| 5,737,514 A | * 4/1998 | Stiffler ........................ | 714/13 |
| 5,907,673 A | * 5/1999 | Hirayama et al. ............. | 714/16 |
| 5,923,832 A | * 7/1999 | Shirakihara et al. ........... | 714/37 |
| 5,958,070 A | * 9/1999 | Stiffler ........................ | 714/13 |
| 6,044,475 A | * 3/2000 | Chung et al. .................. | 714/15 |
| 6,154,877 A | * 11/2000 | Ramkumar et al. .......... | 717/127 |
| 6,161,193 A | * 12/2000 | Garg et al. ..................... | 714/6 |
| 6,161,196 A | * 12/2000 | Tsai ............................. | 714/35 |
| 6,332,200 B1 | * 12/2001 | Meth et al. ................... | 714/16 |
| 6,401,216 B1 | * 6/2002 | Meth et al. ................... | 714/16 |

OTHER PUBLICATIONS

Kierstead et al., "GDB Tutorial", 1993, University of Waterloo, Version 1.1, p. 1–19.*

P. N. Hilfinger, "Simple Use of GDB", 1995, University of California, Department of Electrical Engineering and Computer Sciences, p. 27–31*

B. McNamara, "A quick tutorial on using gdb, the GNU debugger", 1999, p. 1–2.*

* cited by examiner

*Primary Examiner*—Anil Khatri
*Assistant Examiner*—Qamrun Nahar

(57) ABSTRACT

Method and apparatus for resuming execution of a failed computer program. A program is compiled using two compilers to generate first and second sets of object code. Checkpoints are identified in the program, and checkpoint code is generated for execution at the checkpoints. If execution of the first set of object code fails, checkpoint data is recovered and execution of the program is resumed using either the first or second set of object code. In one embodiment, the first set of object code is re-executed before trying the second set of object code.

22 Claims, 4 Drawing Sheets

METHOD AND APPARATUS FOR RESUMING EXECUTION OF A FAILED COMPUTER PROGRAM

FIELD OF THE INVENTION

The present invention generally relates to recovery from errors in computer programs, and more particularly to using alternative code to recover execution of a failed computer program.

BACKGROUND

Certain types of software errors are fatal to program execution. For example, a reference to a memory address that is beyond the address domain of a program will likely result in a fatal error. Certain timing or other transient conditions may also trigger fatal errors. While certain errors may be within the control of the software developer, the developer may be unable to guard against certain other errors in developing the software.

Program errors that are transient or timing-related are problematic to both the program user and to the program developer. From the user's point of view, failure of the program not only interrupts the task at hand, but may also result in lost work product. Reporting such transient errors is also difficult since the conditions required to reproduce the problem are likely to be unknown.

From the developer's point of view, much time may be spent trying to find the root cause of a problem where the root cause is external to the program. Furthermore, tracing the root cause of the problem may be difficult and time-consuming if there is there is scant information available for reproducing the problem.

A method and apparatus that address the aforementioned problems, as well as other related problems, are therefore desirable.

SUMMARY OF THE INVENTION

In various embodiments, a computer implemented method is provided for recovery from fatal program errors. A program is compiled using two compilers to generate first and second sets of object code. Checkpoints are identified in the program, and checkpoint code is generated for execution at the checkpoints. If execution of the first set of object code fails, checkpoint data is recovered and execution of the program is resumed using either the first or second set of object code. In one embodiment, the first set of object code is re-executed before trying the second set of object code. In another embodiment, the second set of object code automatically executed upon failure of the first set of object code.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the present invention provides a method and apparatus for generating alternative code that supports recovery from a fatal program error.

Figure 1:
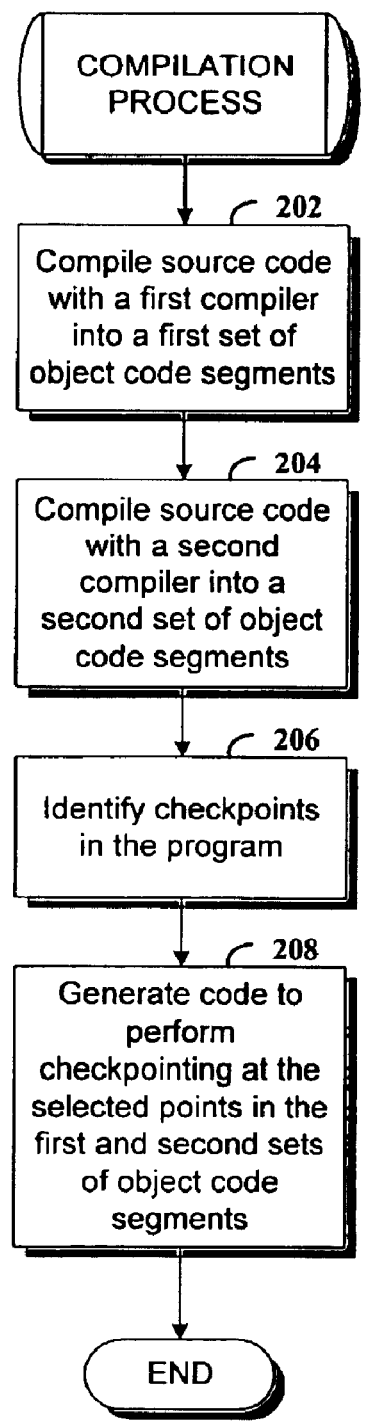
FIG. 1 is a flowchart of a an example process for compiling a program in accordance with one embodiment of the invention.

FIG. 1 is a flowchart of a an example process for compiling a program in accordance with one embodiment of the invention. The process generally entails generating two sets of object code segments using two different compilers or code generators. The second set of object code segments are available for execution in the event that the a fatal program error is encountered in executing the first set of segments. The segments of object code are delineated by checkpoints that are identified by the compiler.

At steps 202 and 204, the program source code is compiled using two different compilers, and two sets of object code that are functionally equivalent are created from the compilation. For example, the compilers may be different versions of the same compiler or compilers from different vendors. For making the two sets of object code interchangeable, checkpoints are identified and checkpoint code is generated for the two sets of object code at step 206. Known computer platforms allow multiple compilers to coexist and also allow inter-operation at the function/procedure call level.

In one embodiment, the checkpoints are identified and the code generated as described in the co-pending patent application entitled, "Compiler-based Checkpointing for Support of Error Recovery" by Ziegler et al. and filed on Oct. 30, 2000, which has patent/application Ser. No. 09/702,590 is commonly assigned to the assignee of the present invention, and the contents of which are incorporated herein by reference. Each segment of code is delineated by a checkpoint, as determined by the compiler. The checkpoints are points in the code when the state of the program stored so that execution can be recovered at the point in the program following the checkpoint. For example, convenient places for checkpoints are procedure boundaries.

At step 208, the code that performs the checkpointing is generated and combined with the intermediate code that was generated from the user's source code. Along with the checkpointing code, a data structure is created for storage of the checkpoint data at step 208.

Figure 2:
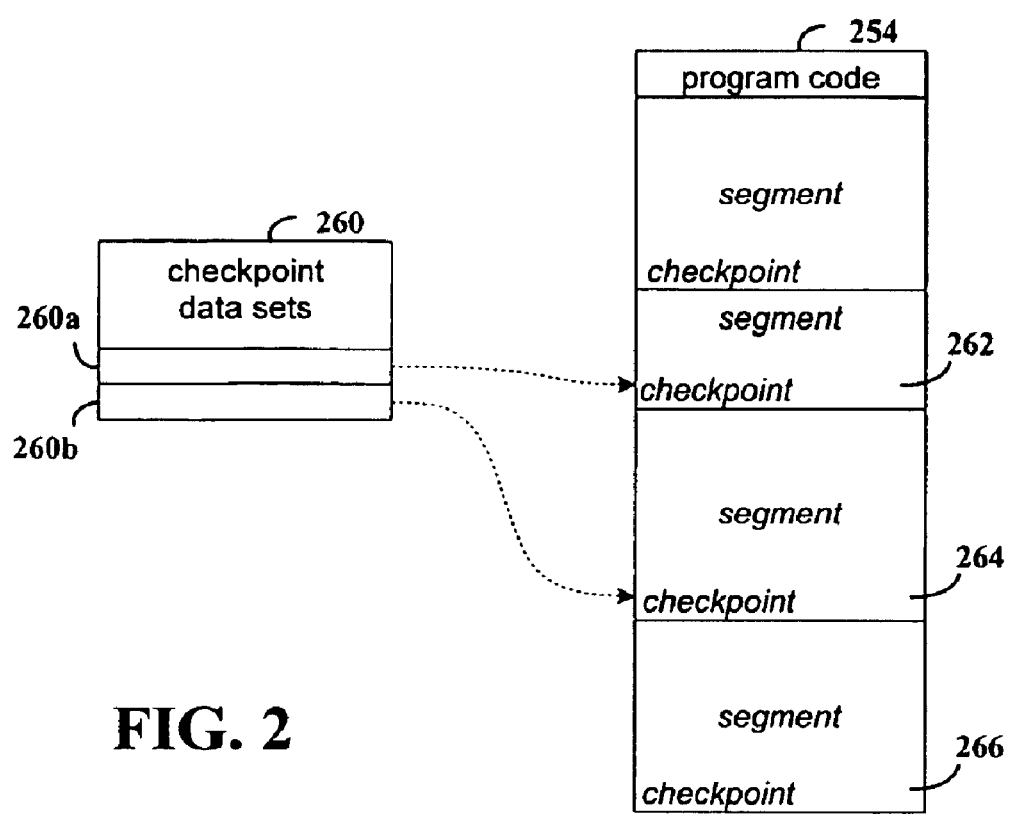
FIG. 2 is a block diagram that illustrates an example data structure used in the management of checkpoints.

FIG. 2 is a block diagram that illustrates an example data structure used in the management of checkpoints in accordance with one embodiment of the invention. To save storage space, two checkpoint data sets 260a and 260b are maintained.

Checkpoint data are alternately stored in checkpoint data sets 260a and 260b for consecutive checkpoints. For example, at time t1, checkpoint data set 260a references checkpoint 262 and checkpoint data set 260b references checkpoint 264. At time t2 after program execution completes checkpoint 266, checkpoint data set 260a references checkpoint 266, and checkpoint data set 260b references checkpoint 264.

Timestamps or commit flags may be used in alternative embodiments to indicate which of the checkpoint data sets is to be used in recovery. The timestamp scheme involves writing a timestamp to a checkpoint data set when the storage of state information in the checkpoint data set is complete. Thus, the later of the two timestamps indicates which of checkpoint data sets 260a or 260b is to be used in recovery. The commit flag scheme involves a flag that indicates which of checkpoint data sets 260a or 206b is to be used in recovery.

Figure 3:
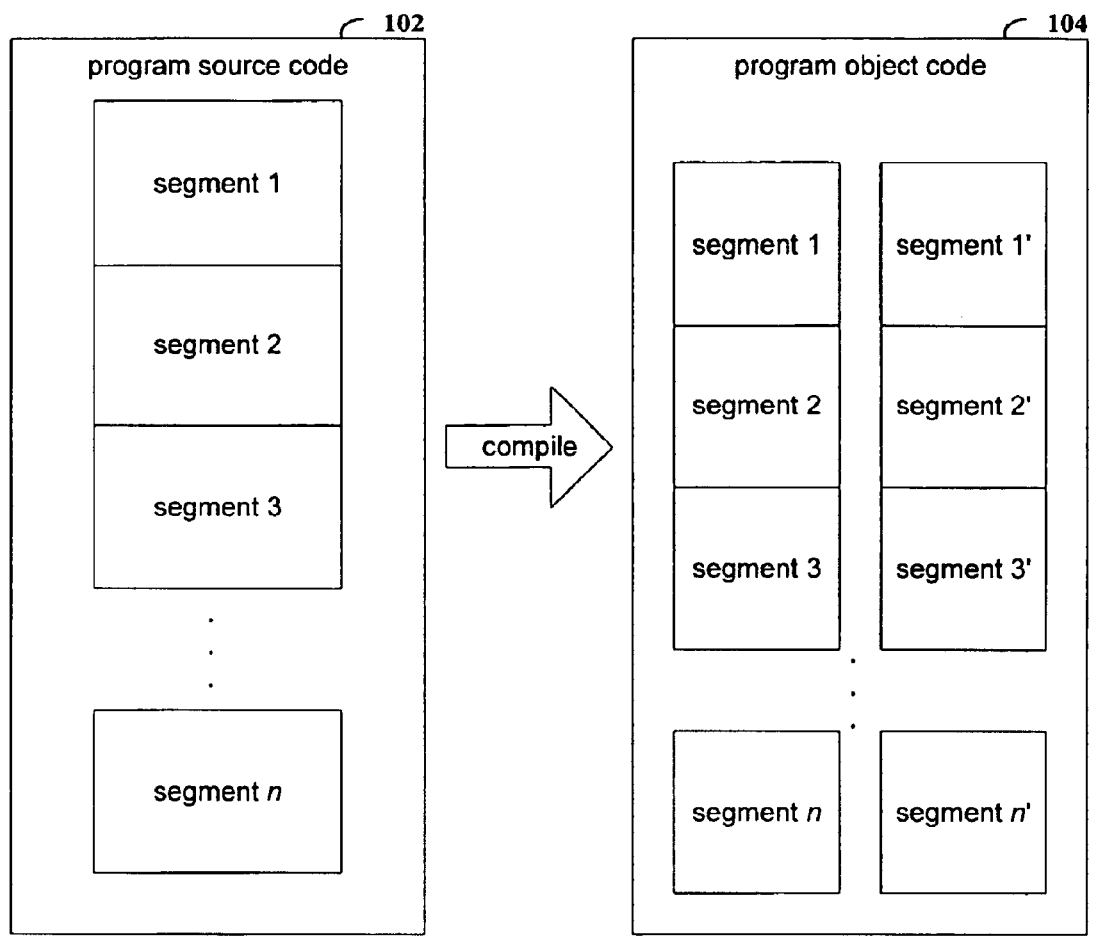
FIG. 3 is a block diagram that illustrates the code that results from compilation of a program in accordance with one embodiment of the invention.

FIG. 3 is a block diagram that illustrates the code that results from compilation of a program in accordance with one embodiment of the invention. One purpose for compiling code in the manner taught herein is to enable recovery from fatal program errors. Block 102 represents program source code that is to be compiled and is comprised of n segments of source code. Checkpoints are used to delineate the multiple segments. A checkpoint is a location in the code at which execution can recommence should the program encounter a fatal error. At each checkpoint, the state of data elements used by the program are stored so that in the event of program failure the state information can be recovered and execution resumed immediately after the checkpoint from which the state was recovered. In various embodiments the checkpoints can be user-programmed or identified by the compiler using recognized techniques.

Compilation of the program source code results in program object code 104 that includes two sets of object segments, object segments 1-n and object segments 1-n'. The object segments in each set correspond to the source segments of program source code 102.

Each set of object segments is code that is generated in compiling the source code with different compilers or code generators. In other words, object segments 1'-n' are generated by a first compiler, and object segments 1'-n' are generated by a different compiler. If the program fails during execution of segment i, for example, then the state of the checkpoint data can be recovered from checkpoint that precedes segment i and execution can resume at segment i'.

Figure 4:
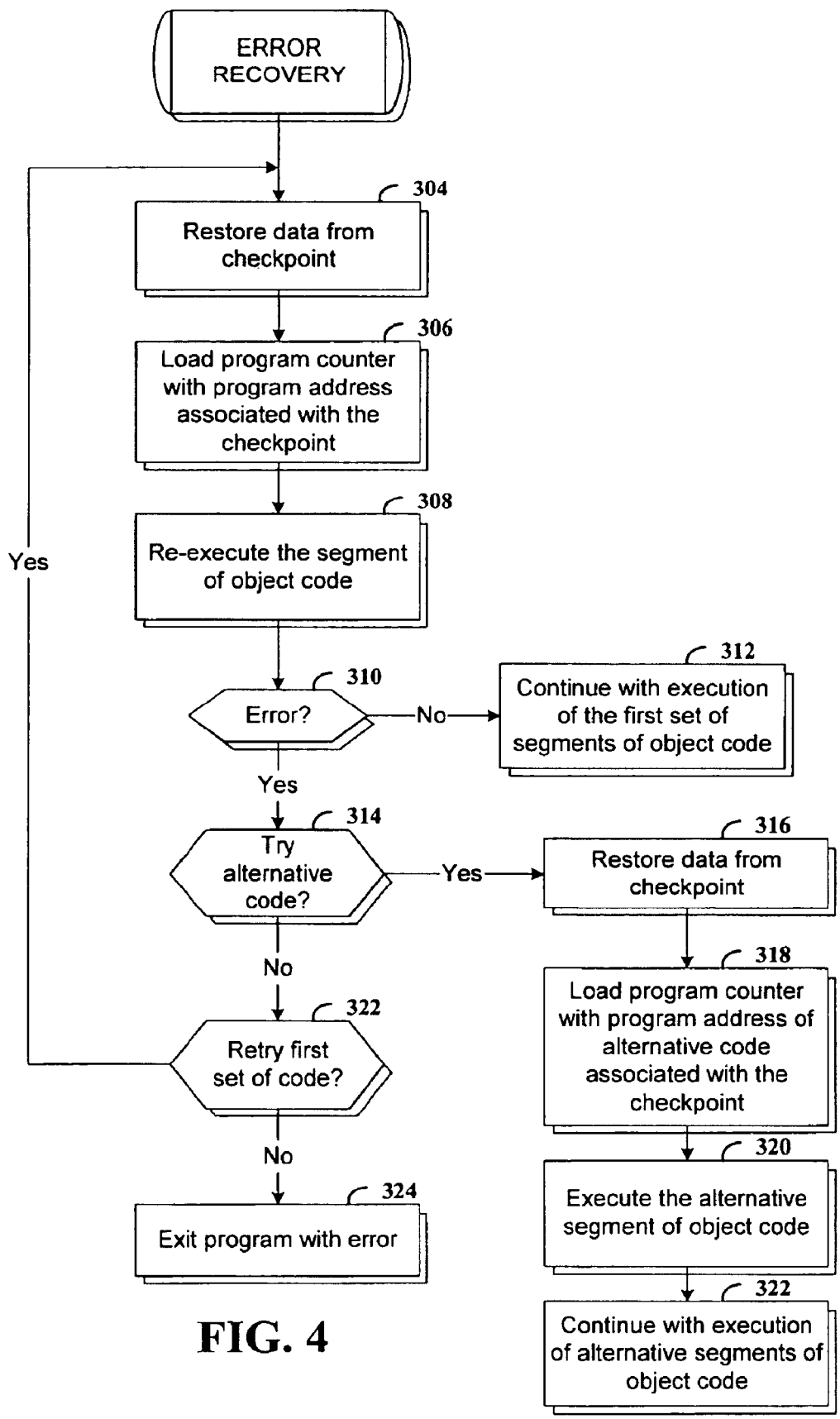
FIG. 4 is a flowchart of an example process for error recovery.

FIG. 4 is a flowchart of an example process for error recovery in accordance with one embodiment of the present invention. The process generally entails recovering from a fatal program error by restoring checkpoint data and resuming execution of the program. In resuming execution, the code of the first set of segments is retried. If the failure is repeated, execution of the program is resumed using the alternative set of segments.

The process begins when a program error has been detected by the operating system, for example. At step 304, checkpoint data is restored, and at step 306 the program counter is reset to the selected checkpoint. The segment of object code from the first set of segments is re-executed at step 308. If the program executes the segment without error, decision step 310 and step 312 illustrate that the program continues with execution of the segments from the first set.

If an error recurs in executing the segment of code from the first set, control is directed to decision step 314, which determines whether the alternative code should be tried. In one embodiment, the first set of segments of code may be re-executed a selected number of times before trying execution of the alternative code. Control is directed to step 316 when the decision is made to execute the alternative code.

At step 316, checkpoint data is restored, and at step 318, the address of the segment of object code from the second set is selected for execution. That is, the program counter is loaded with a program address of a segment in the second set. At step 320, the alternative segment of object code is executed, and execution of the segments of code from the second set continues at step 322.

Returning now to decision step 314, if the decision is made to not execute the alternative code, control is directed to decision step 324. Decision step 324 tests whether execution of the segment from the first set of segments should be attempted again. If so, control is returned to stop 304 to restore the checkpoint data and try again. Otherwise, the program is exited with an error.

The present invention is believed to be applicable to compilers for a variety of programming languages. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for software error recovery, comprising:

compiling program source code into a first set of object code with a first compiler;

compiling the program source code into a second set of object code with a second compiler;

identifying checkpoints in the first and second sets of object code, each checkpoint in the first set of object code corresponding to a checkpoint in the second set of object code;

associating sets of data objects with the checkpoints;

automatically generating executable checkpoint code for execution at the checkpoints, the checkpoint code configured to store state information of the associated data objects for recovery if execution of the program is interrupted;

executing the first set of object code;

storing the state information in executing the checkpoint code;

upon detecting an error in execution of the first set of object code, initially re-executing the first set of object code; and resuming execution using the second set of object code if the first set of object code fails in re-execution.

2. The method of claim 1, further comprising re-executing the first set of object code a selected number of times before resuming execution using the second set of object code.

3. The method of claim 2, further comprising ceasing resumption of execution of the first and second sets of object code if an error is detected in executing both sets of object code.

4. A computer-implemented method for software error recovery, comprising:

compiling program source code into a first set of object code with a first compiler;

compiling the program source code into a second set of object code with a second compiler;

identifying checkpoints in the first and second sets of object code, each checkpoint in the first set of object code corresponding to a checkpoint in the second set of object code;

associating sets of data objects with the checkpoints;

automatically generating executable checkpoint code for execution at the checkpoints, the checkpoint code configured to store state information of the associated data objects for recovery if execution of the program is interrupted;

executing the first set of object code;

storing the state information in executing the checkpoint code; and upon detecting an error in execution of the first set of object code, selecting between the first set of object code and the second set of object code in resuming execution of the program.

5. The method of claim 4, further comprising:

upon detecting an error in execution of the first set of object code, initially re-executing the first set of object code; and resuming execution using the second set of object code if the first set of object code fails in re-execution.

6. The method of claim 5, further comprising re-executing the first set of object code a selected number of times before resuming execution using the second set of object code.

7. The method of claim 6, further comprising ceasing resumption of execution of the first and second sets of object code if an error is detected in executing both sets of object code.

8. An apparatus for software error recovery, comprising:

means for compiling program source code into a first set of object code with a first compiler;

means for compiling the program source code into a second set of object code with a second compiler;

means for identifying checkpoints in the first and second sets of object code, each checkpoint in the first set of object code corresponding to a checkpoint in the second set of object code;

means for associating sets of data objects with the checkpoints; and means for automatically generating executable checkpoint code for execution at the checkpoints, the checkpoint code configured to store state information of the associated data objects for recovery if execution of the program is interrupted;

means for executing the first set of object code;

means for storing the state information in executing the checkpoint code;

means, responsive to an error detected in execution of the first set of object code, for initially re-executing, the first set of object code; and means for resuming execution using the second set of object code if the first set of object code fails in re-execution.

9. An apparatus for software error recovery, comprising:

means for compiling program source code into a first set of object code with a first compiler;

means for compiling the program source code into a second set of object code with a second compiler;

means for identifying checkpoints in the first and second sets of object code, each checkpoint in the first set of object code corresponding to a checkpoint in the second set of object code;

means for associating sets of data objects with the checkpoints;

means for automatically generating executable checkpoint code for execution at the checkpoints, the checkpoint code configured to store state information of the associated data objects for recovery if execution of the program is interrupted;

means for executing the first set of object code;

means for storing the state information in executing the checkpoint code; and means for selecting between the first set of object code and the second set of object code in resuming execution of the program upon detecting an error in execution of the first set of object code.

10. A computer program product configured for causing a computer to perform the steps comprising:

compiling program source code into a first set of object code with a first compiler;

compiling the program source code into a second set of object code with a second compiler;

identifying checkpoints in the first and second sets of object code, each checkpoint in the first set of object code corresponding to a checkpoint in the second set of object code;

associating sets of data objects with the checkpoints;

automatically generating executable checkpoint code for execution at the checkpoints, the checkpoint code configured to store state information of the associated data objects for recovery if execution of the program is interrupted;

executing the first set of object code;

storing the state information in executing the checkpoint code; and upon detecting an error in execution of the first set of object code, selecting between the first set of object code and the second set of object code in resuming execution of the program.

11. The computer program product of claim 10, further configured for causing a computer to perform the steps comprising:

upon detecting an error in execution of the first set of object code, initially re-executing the first set of object code; and resuming execution using the second set of object code if the first set of object code fails in re-execution.

12. The computer program product of claim 11, further configured for causing a computer to perform the step comprising re-executing the first set of object code a selected number of times before resuming execution using the second set of object code.

13. The computer program product of claim 12, further configured for causing a computer to perform the step comprising ceasing resumption of execution of the first and second sets of object code if an error is detected in executing both sets of object code.

14. A processor-based method for software error recovery, comprising:

compiling program source code into a first set of object code with a first compiler;

compiling the program source code into a second set of object code with a second compiler, wherein functions implemented by the first and second code sets are identical, and code in the first set of object code is different from code in the second set of object code;

identifying checkpoints in the first and second sets of object code, each checkpoint in the first set of object code corresponding to a checkpoint in the second set of object code;

associating sets of data objects with the checkpoints;

automatically generating executable checkpoint code for execution at the checkpoints, the checkpoint code configured to store state information of the associated data objects for recovery if execution of the program is interrupted;

executing the first set of object code and not executing the second set of object code while the first set of object code is executing;

storing the state information in executing the checkpoint code; and in response to detecting an error in execution of the first set of object code, selecting one of the first set of object code and the second set of object code in resuming execution of the program, and not executing the non-selected one of the first and second sets of object code.

15. The method of claim 14, further comprising:

in response to detecting an error in execution of the first set of object code, initially re-executing the first set of object code; and resuming execution using the second set of object code in response to the first set of object code failing in re-execution.

16. The method of claim 15, further comprising re-executing the first set of object code a selected number of times before resuming execution using the second set of object code.

17. The method of claim 16, further comprising ceasing resumption of execution of the first and second sets of object code in response to detection of an error in executing both sets of object code.

18. An apparatus for software error recovery, comprising:

means for compiling program source code into a first set of object code with a first compiler;

means for compiling the program source code into a second set of object code with a second compiler, wherein functions implemented by the first and second sets of object code are identical, and code in the first set of object code is different from code in the second set of object code;

means for identifying checkpoints in the first and second sets of object code, each checkpoint in the first set of object code corresponding to a checkpoint in the second set of object code;

means for associating sets of data objects with the checkpoints;

means for automatically generating executable checkpoint code for execution at the checkpoints, the checkpoint code configured to store state information of the associated data objects for recovery if execution of the program is interrupted;

means for executing the first set of object code, wherein the second set of object code is not executed while the first set of object code is executing;

means for storing the state information in executing the checkpoint code; and means, responsive to detection of an error in executing the first set of object code, for selecting between the first set of object code and the second set of object code in resuming execution of the program, wherein the non-selected one of the first and second sets of object code is not executed.

19. A program storage device, comprising:

a processor-readable medium configured with processor-executable instructions for causing a processor to perform the steps including, compiling program source code into a first set of object code with a first compiler;

compiling the program source code into a second set of object code with a second compiler, wherein functions implemented by the first and second sets of object code are identical, and code in the first set of object code set is different from code in the second set of object code;

identifying checkpoints in the first and second sets of object code, each checkpoint in the first set of object code corresponding to a checkpoint in the second set of object code;

associating sets of data objects with the checkpoints;

automatically generating executable checkpoint code for execution at the checkpoints, the checkpoint code configured to store state information of the associated data objects for recovery if execution of the program is interrupted;

executing the first set of object code and not executing the second set of object code while the first set of object code is executing;

storing the state information in executing the checkpoint code; and in response to detecting an error in execution of the first set of object code, selecting between the first set of object code and the second set of object code in resuming execution of the program, and not executing the non-selected one of the first and second sets of object code.

20. The program storage device of claim 19, wherein the processor-readable medium is further configured with instruction for causing a processor to perform the steps including, in response to detecting an error in execution of the first set of object code, initially re-executing the first set of object code; and resuming execution using the second set of object code in response to the first set of object code failing in re-execution.

21. The program storage device of claim 20, wherein the processor-readable medium is further configured with instruction for causing a processor to perform the step including, re-executing the first set of object code a selected number of times before resuming execution using the second set of object code.

22. The program storage device of claim 21, wherein the processor-readable medium is further configured with instruction for causing a processor to perform the steps including, ceasing resumption of execution of the first and second sets of object code in response to detection of an error both sets of object code.

* * * * *

UNITED STATES PATENT AND TRADEMARK OFFICE
CERTIFICATE OF CORRECTION

PATENT NO. : 6,874,138 B1  Page 1 of 1
APPLICATION NO. : 09/724616
DATED : March 29, 2005
INVENTOR(S) : Michael L. Ziegler et al.

It is certified that error appears in the above-identified patent and that said Letters Patent is hereby corrected as shown below:

Claim 22, Column 8, line 52, after "error" insert --in executing--

Signed and Sealed this

Twenty-seventh Day of May, 2008

JON W. DUDAS
*Director of the United States Patent and Trademark Office*